Nov. 20, 1951  R. A. WILLIAMS, SR  2,575,608
MACHINE FOR HARD BOILING AND SHELLING OF EGGS
Filed July 17, 1947  6 Sheets-Sheet 1

INVENTOR.
Russell A. Williams, Sr.
BY Victor J. Evans & Co.
ATTORNEYS

Nov. 20, 1951  R. A. WILLIAMS, SR  2,575,608
MACHINE FOR HARD BOILING AND SHELLING OF EGGS
Filed July 17, 1947  6 Sheets-Sheet 2

INVENTOR.
Russell A. Williams, Sr,
BY Victor J. Evans & Co.
ATTORNEYS

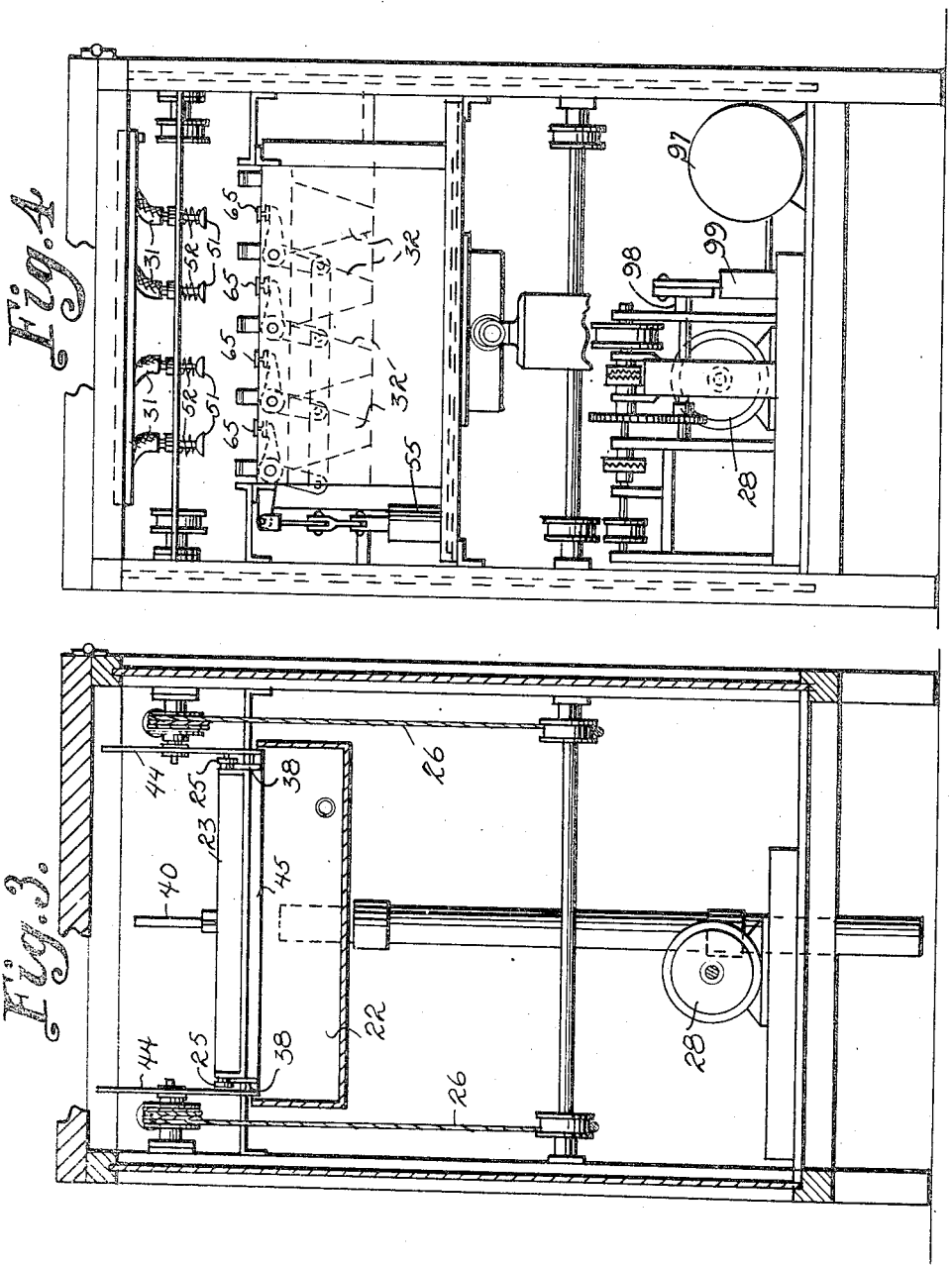

Nov. 20, 1951  R. A. WILLIAMS, SR  2,575,608
MACHINE FOR HARD BOILING AND SHELLING OF EGGS
Filed July 17, 1947  6 Sheets-Sheet 4
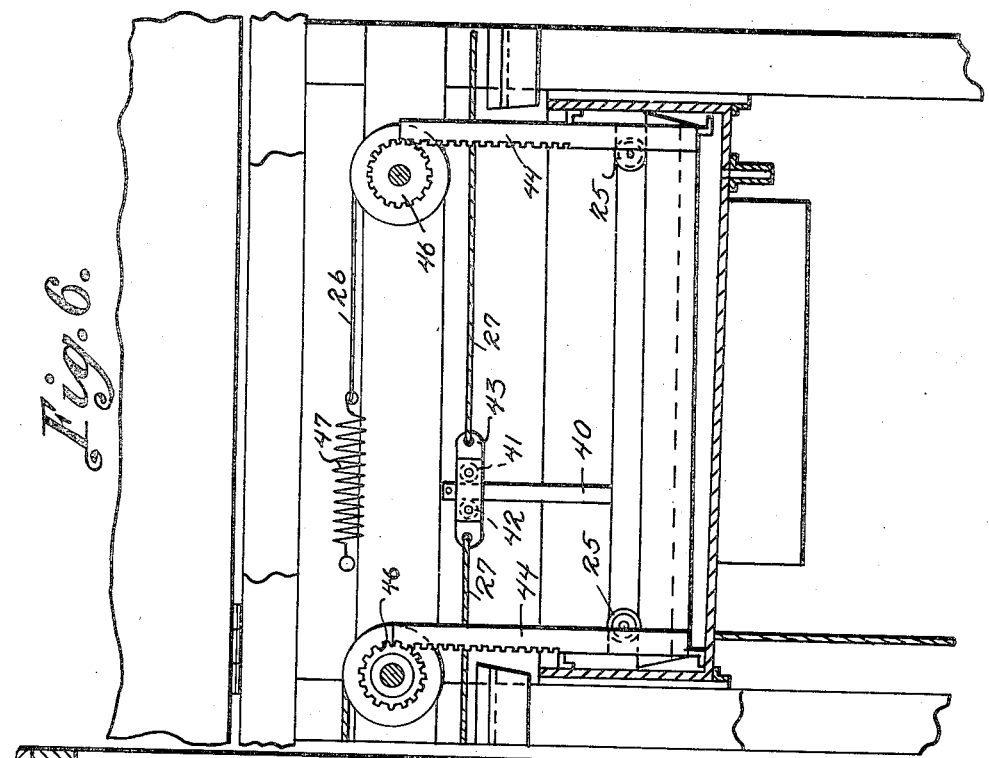
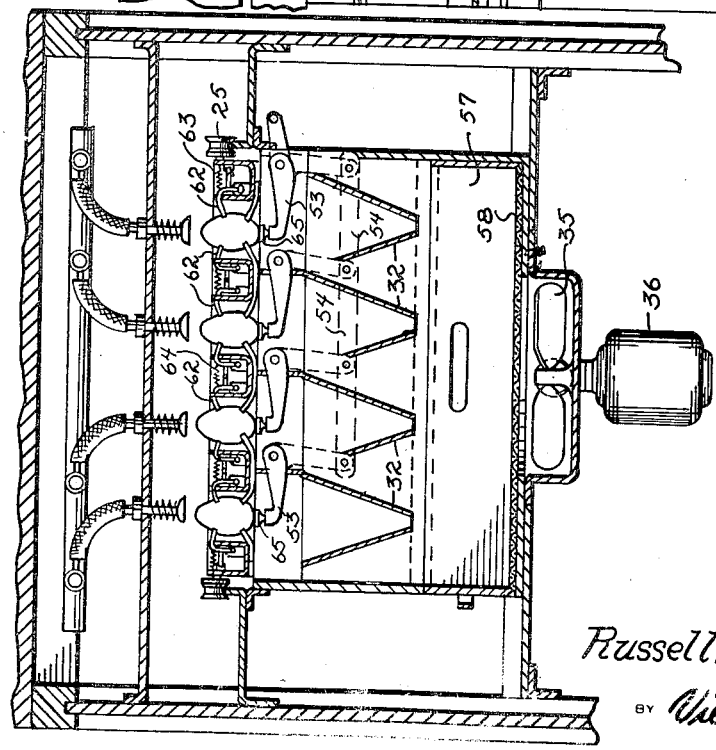
INVENTOR.
Russell A. Williams, Sr.
BY *Victor J. Evans & Co.*
ATTORNEYS Nov. 20, 1951 R. A. WILLIAMS, SR 2,575,608
MACHINE FOR HARD BOILING AND SHELLING OF EGGS
Filed July 17, 1947 6 Sheets-Sheet 5
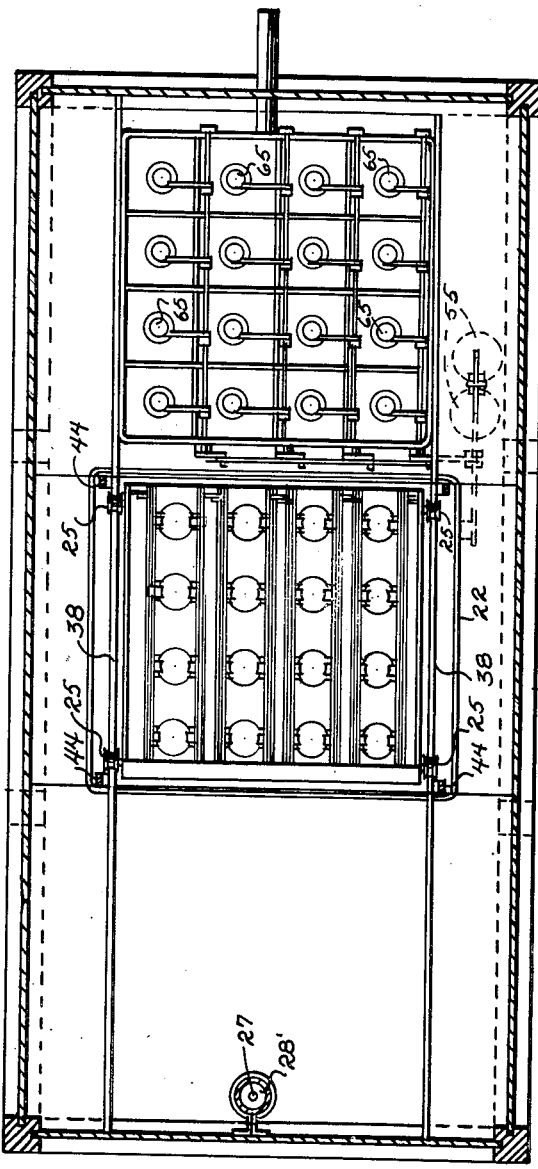
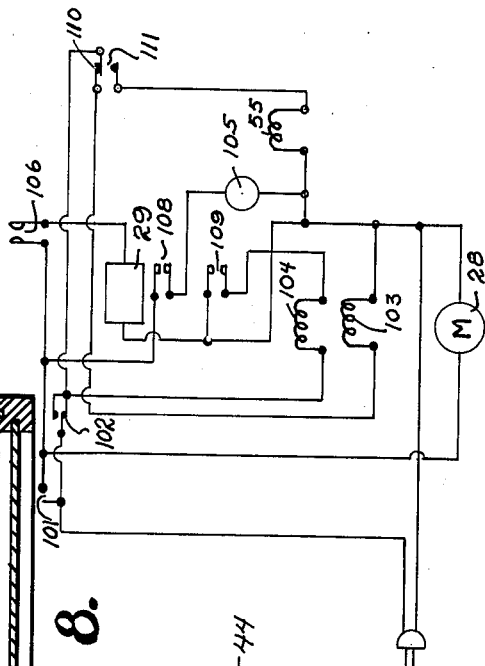
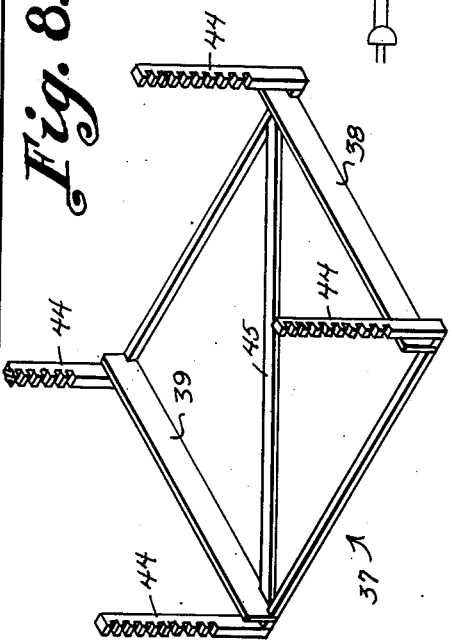
INVENTOR.
Russell A. Williams, Sr.
BY Victor J. Evans & Co.
ATTORNEYS

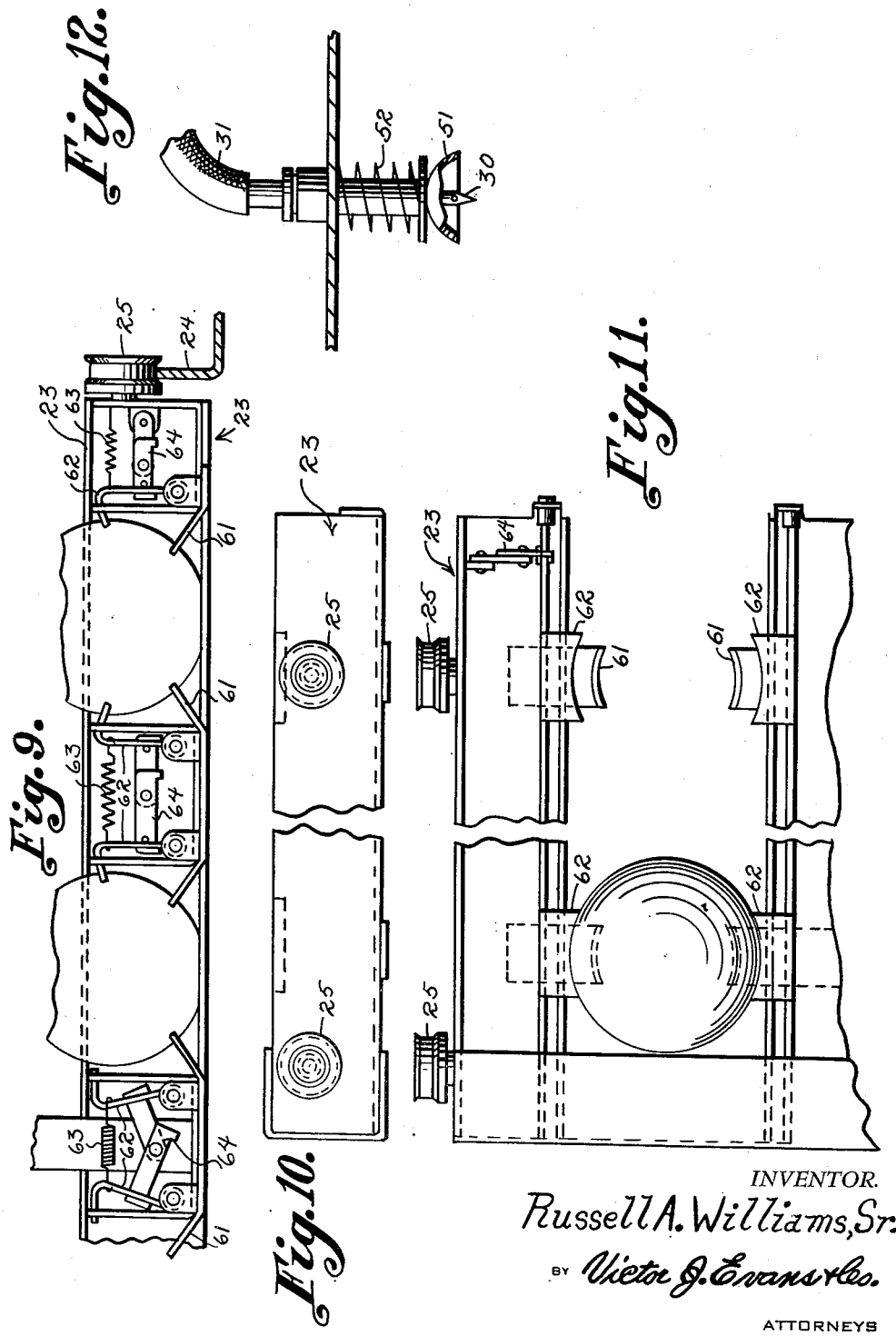

Patented Nov. 20, 1951

2,575,608

UNITED STATES PATENT OFFICE 2,575,608

MACHINE FOR HARD BOILING AND SHELLING OF EGGS

Russell A. Williams, Sr., Johnson City, N. Y.

Application July 17, 1947, Serial No. 761,718

4 Claims. (Cl. 99—355)

This invention relates to machines for the hard boiling and shelling of eggs.

It is an object of the present invention to provide a machine in which the eggs are cooked for a predetermined time after which the eggs are removed from the cooking portion of the machine and are then automatically shelled.

A further object of the invention is to provide a device for shelling the eggs and for separating the cooked eggs from the shells.

It is a feature of the invention that the attendance of an operator is not required except to load the eggs in the machine and to remove the cooked and shelled eggs therefrom.

Other and further objects will become apparent upon reading the following specification together with the accompanying drawings forming a part hereof.

Fig. 3 shows a view in sectional elevation taken along line 3—3 of Fig. 1 and looking in the direction of the arrows thereof.

Fig. 4 is a sectional end view in elevation of the machine shown in Fig. 1 taken along the line 4—4 of Fig. 1 and looking in the direction of the arrows thereof.

Fig. 5 is an enlarged sectional view taken along the line 5—5 of Fig. 1.

Fig. 6 shows an enlarged sectional view, in elevation, of the egg cooking portion of the machine.

Fig. 7 is a sectional plan view taken along the line 7—7 of Fig. 1.

Fig. 8 is a view in perspective of the device used for raising and lowering the eggs in order to bring them into the water for cooking and for removing them therefrom.

Fig. 9 is an enlarged fragmentary sectional view, in elevation, showing the arrangements for retaining the eggs in the tray in which they are carried through the machine.

Fig. 10 is an enlarged fragmentary side view of the tray in which the eggs are carried as they pass through the machine.

Fig. 11 is an enlarged fragmentary plan view showing a corner of the tray illustrated in Fig. 10.

Fig. 12 is an enlarged fragmentary sectional view, in elevation, of an air nozzle used in shelling the eggs.

Fig. 12a is a schematic circuit diagram of the electrical connections used in the machine.

Figure 1:
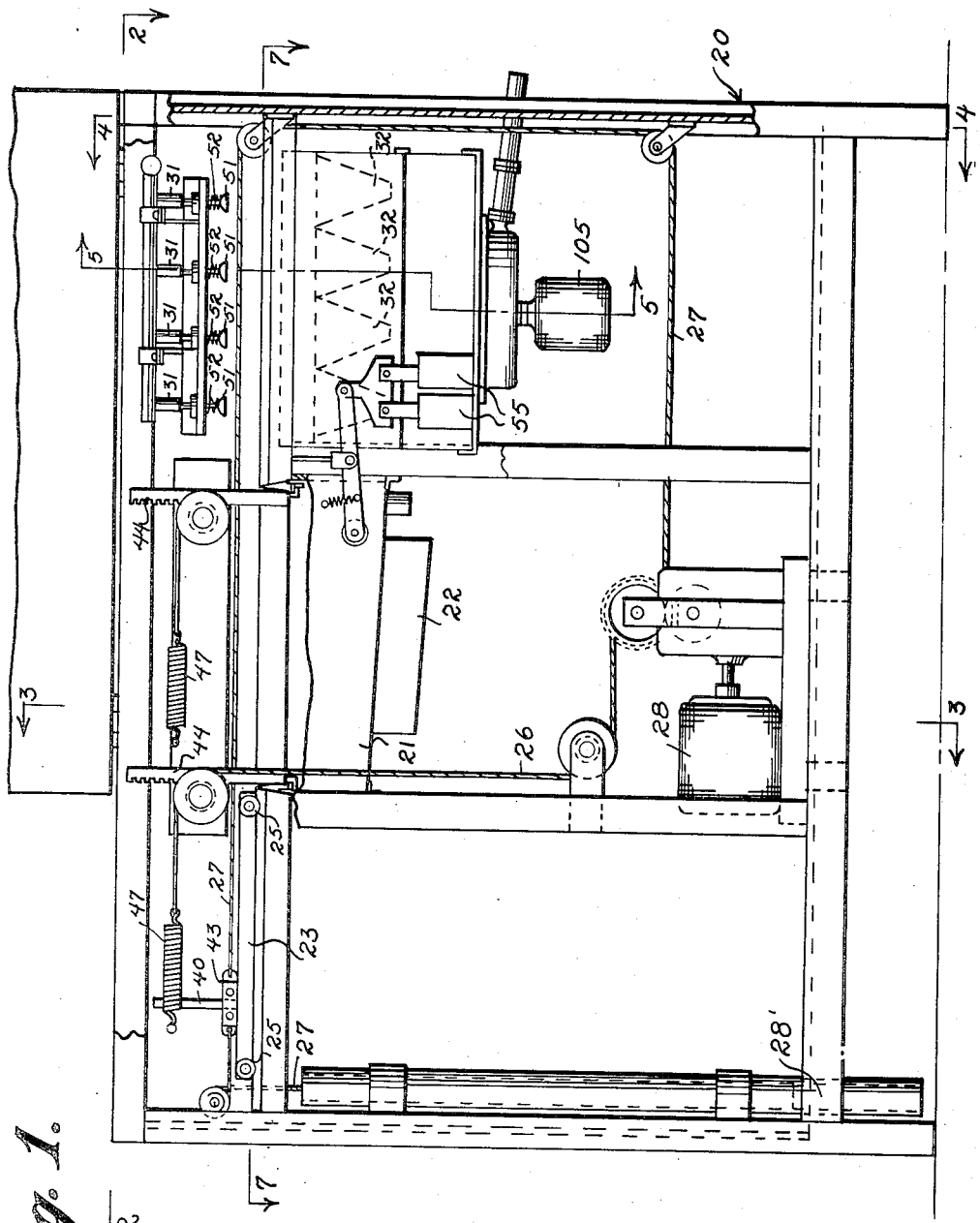
Fig. 1 shows a view in elevation of an embodiment of the invention.
Figure 2:
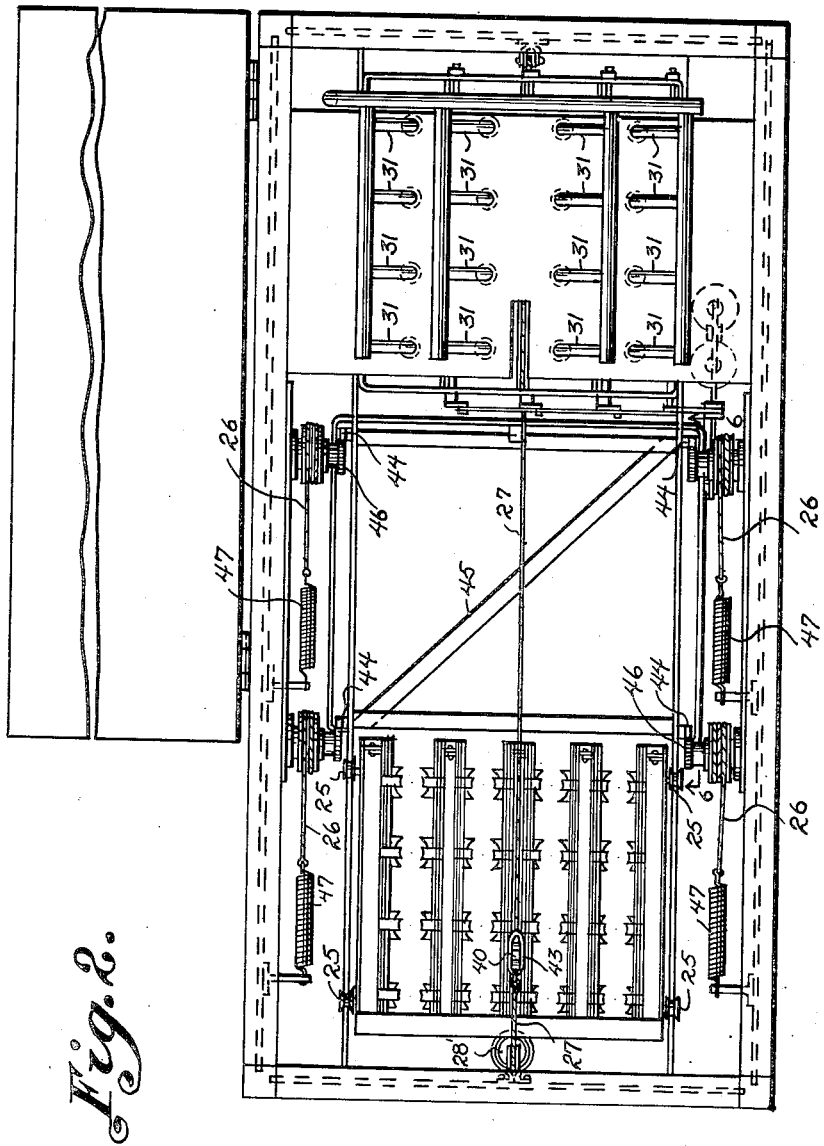
Fig. 2 shows a plan view of the machine illustrated in Fig. 1.

Referring to Fig. 1, the machine comprises a frame work 20, in which the various parts of the machine are mounted. 21 represents a cooking tank in which the eggs are hard boiled and 22 is the heating apparatus for maintaining the water at a boiling temperature. The heating apparatus 22 may be operated by electricity, gas, fuel oil such as kerosene, or in any other convenient manner.

The eggs are carried through the machine in a tray 23 which is supported by groove wheels 25 on rails 24. The position of the tray is controlled by cables 26 and 27. A counter weight 28' is provided for the cable 27 which draws the tray horizontally from left to right through the machine. Cables 26 are used for raising and lowering the tray for the cooking operation. The two sets of cables are individually controlled by clutches and the power is derived from the motor 28.

The eggs to be cooked are loaded at the loading end of the machine at the left hand end as shown in Fig. 1. After loading, they are moved to an intermediate position over the cooking vessel 21 and are lowered therein for cooking. The time of cooking is controlled by an electrically operated timer 29, shown in Fig. 12a. At the end of the cooking interval, the tray containing the eggs is raised from the cooking chamber 21 and is moved to the extreme right of the machine. At this point each egg is pierced by a hollow needle 30 shown in Fig. 12 which is connected by a hose 31 to a suitable supply of air under pressure. The compressed air entering each egg breaks the shell thereof and after the shell has thus been broken, the eggs are dropped into a plurality of the vacuum bags 32, these bags serving to strip any remaining shell from the eggs. The shelled eggs then drop into a vacuum chamber. If desired, suitable screens may be provided to separate the shelled eggs and the shells and the shells passing through the screens may be discharged as waste in any convenient manner.

For cooking, the eggs pass into a frame member 37. This is provided with side rails 38 and 39 adapted for engagement with the rollers 25 of tray 23. Tray 23 is provided with an upwardly extending guide member 40 which engages a pair of rollers 41 and 42 carried in a frame 43 which is secured to cable 27. Tension is maintained in cable 27 by the counter weight 28'. The cooking frame 37 is shown provided with four vertically extending rack members 44 and a diagonal brace member 45. The rack members 44 are adapted for engagement with the four pinions 46. Retractile springs 47 urge the cooking frame 37 into its uppermost position by means of the raising and lowering cables 26. As previously noted, these are controlled by clutches and a winding drum mechanism utilizing power derived from motor 28. When the eggs are to be cooked, the tray 23 is positioned on the frame member 37 and tension is applied to raising and lowering cables 26 which actuate pinions 46. Turning of the pinions 46 causes the egg tray to be lowered into the cooking chamber 21, where the eggs come in contact with boiling water. At the end of the cooking interval, cables 26 are released and the egg tray is raised out of the boiling water by the action of the retractile springs 47. The tray is then drawn to the extreme right end of the machine where the eggs are shelled.

The arrangement for the shelling of the eggs comprises means for raising each egg from the tray and bringing it into contact with a needle, the needle being supplied with air under pressure. The needle penetrates the shell of the egg and the compressed air breaks the shell. The egg is then dropped into a conical bag which communicates with a vacuum chamber. In being drawn through the vacuum bag, the sides of the egg are forced into contact with the bag thereby removing any small fragments of the shell which may still remain attached to the egg.

Each of the piercing needles 30 is connected by a hose or flexible tubing 31 to a suitable source of air under pressure. A guard member 51 is shaped to fit over the upper end of an egg and is slidably mounted on the needle 30. A compression spring 52 urges the guard member 51 into its lowermost position. This arrangement permits adjustment for variations in the dimensions of the individual eggs.

At the right hand end of the machine where the shelling operation takes place, there are a plurality of levers 53 interconnected by a link bar 54. These levers 53 are simultaneously operated by solenoids 55. Upon energization of solenoids 55, all of the levers 53 are actuated to press each egg upwardly and into contact with one of the puncturing needles 30.

After having been subjected to the action of the compressed air, levers 53 are released permitting the eggs to drop down through the tray into the suction bags 32 where they enter a drawer 57 from which they may be removed as desired. It will be noted that the drawer 57 has a screen bottom 58 which connects with the vacuum chamber containing the centrifugal rotor 35. A further screen may be provided if desired within the drawer 57 to separate the shells from the eggs. In addition, the drawer 57 is sufficiently tightly fitted so as to maintain the required degree of vacuum on the under side of the vacuum bags 32.

Referring now to Fig. 9, it will be seen that the tray 23 comprises a pair of supporting members 61 for each egg and a pair of pivotally mounted locking members 62. Each locking member is urged away from contact with the egg by a tension spring 63 and held in engagement with the egg by a toggle mechanism 64. The toggle mechanism is located at the right hand end of the tray and is unlocked to free the eggs as the tray reaches the right hand end of the machine by suitable stop means which may take any convenient form and which is not shown. The eggs are thus released so that they may be raised into contact with the piercing needles.

The cups 65 which are attached to the lifting levers 53 may be vacuum cups if desired, which will retain the egg firmly in position while the shells are being exploded by the compressed air. It is desirable that the air pressure build up slowly allowing the air to penetrate between the exterior of the egg and the internal surface of the shell before sufficient pressure is applied to explode the shell. This initial low pressure followed by a higher pressure may be applied by any desired means.

After the shells have been exploded, the lifting levers 53 are withdrawn by deenergization of the solenoid to a point where the eggs are deposited in the vacuum bags 52. Where suction is applied to the cups 65, the withdrawal of the levers should be accompanied by a maintenance of the suction which will draw the eggs through the apertures in the tray. After the eggs are in a position to drop into the vacuum bags, the suction should be released.

The arrangements provided for automatic control of the machine may be electrical, pneumatic, hydraulic or may combine various features of either type of control as desired. In Fig. 12a is shown a circuit diagram illustrating one method in which the automatic control may be provided. This comprises the usual limit switches, timers, solenoids and similar equipment arranged to produce the cycle of operation described in known manner.

Referring to Fig. 12a, 101 represents a main switch which energizes the motor 28. Switch 101 may be actuated manually or it may be arranged to energize the remainder of the machine when the tray is advanced slightly, by pushing the same, toward the boiling tank. Using this latter method when the machine is returned to its normal position by counter weight 28', the machine will be automatically stopped. 103 represents a magnet controlling a clutch which connects motor 28 to pull table 27 advancing the tray through the machine. 104 represents a clutch magnet for raising and lowering the tray from the tank. The first energization will lower the tray into the tank and the subsequent energization will raise the tray. 55 represents the solenoid magnet which raises the eggs to bring them into engagement with the puncturing needle. 105 represents a motor which, when energized, produces a vacuum for use with the vacuum bags 32. 106 represents a pair of contacts operatively associated with a thermostat of conventional construction in the boiling tank. These contacts are arranged to close when the water is at the proper temperature and to delay the starting of the timing interval as measured by timer 29 until the water has reached the proper temperature. 108 represents contacts controlled by timer 29 which cause the vacuum apparatus to start functioning at the end of the timing interval. 109 represents a pair of contacts, also under control of timer 29, which close at the expiration of the timing interval in order to raise the tray. These contacts are closed before the beginning of the timing interval in order to permit energization of clutch magnet 104 to lower the tray. 110 represents contacts operative at the end of the travel of the tray to prevent further advance of the tray after it has reached the egg breaking position and is arranged to deenergize clutch magnet 103 thus preventing any further advance. As contacts 110 open, contacts 111 close energizing solenoid 55 to raise the eggs into breaking position. These contacts may be maintained closed by a dash pot or other suitable device with sufficient interval to make sure that the eggs have all been punctured and the shells exploded.

In returning under control of the dash pot contact 110 and contact 111 both remain open a sufficient interval to allow the tray to return to the loading end of the machine thereby opening contact 101 and preventing further operation after contacts 110 close.

In operation, it is desirable that the eggs be inserted in the tray with the small ends upward, in order to facilitate the breaking of the shell by providing a small air space for penetration of the pneumatic needle. If desired, an air pump 99 may be operated from shaft 98 driven by motor 28 in order to obtain a supply of compressed air for the puncturing of the eggs. Pump 99 communicates with compressed air storage tank 97 in conventional manner. Check valves, strainers and reducing valves may be provided in conventional arrangement as desired to obtain the pressure relationships required for the exploding of the egg shells. A solenoid valve (not shown) may be provided and it may be energized either from the same circuit as lifting solenoid 55 or in conjunction with a limit switch responsive to the operation of an egg lifting lever 53 so that it will not permit air to enter the piercing needles until the eggs have been pierced.

I have shown what I believe to be the best embodiments of my invention. I do not wish to be limited to the embodiments shown but what I claim is new and desire to secure by Letters Patent of the United States is defined in the appended claims.

I claim:

1. In a device of the character described, a tray having a holding means therein for retaining a plurality of eggs, means supporting the tray for horizontal movement from a loading position to a cooking position, a cooking tank for receiving the tray containing the eggs, means for raising and lowering the tray into and out of said tank, power means for moving the tray from one of its positions to the other position, and timing means for controlling the length of time the tray remains in the tank.

2. In an egg boiling machine, the combination which comprises a frame, a pair of spaced horizontally disposed rails providing a track on said frame, a tray having wheels on the sides adapted to travel on said track with the wheels positioned on the rails, means temporarily retaining eggs in spaced relation in said tray, a cooking member adapted to contain boiling water positioned below a section of said track, said track having a gap therein positioned above said cooking member, a frame member positioned above the cooking member and having vertically disposed gear racks at the corners thereof, said frame member positioned below the gap of the track and rail section of the gap being carried by the frame member, a pinion journaled on the frame of the machine and positioned to mesh with the gear rack of the frame member, motor actuated cables for rotating the pinion for lowering track sections and tray, time means for controlling the time the eggs remain in the tank, and springs for returning the tray and track sections to positions wherein the track sections are aligned with the track.

3. An egg boiling machine as described in claim 2, wherein the means for actuating the tray on the track includes a cable also actuated by the said motor and the cable is provided with a frame having rollers therein between which a guide extended upwardly from said tray is positioned whereby the guide member of the tray permits the tray to drop downwardly into the cooking member without disengaging the tray from the operating cable.

4. An egg boiling machine as described in claim 2, wherein the machine is provided with a motor actuated cable connected to the tray for drawing the tray in one direction on the track and in which a counter weight is provided at the end of the cable for returning the tray on the track.

RUSSELL A. WILLIAMS, Sr.

REFERENCES CITED

The following references are of record in the file of this patent:

UNITED STATES PATENTS

| Number | Name | Date |
|---|---|---|
| 192,946 | Smith | July 10, 1877 |
| 787,837 | DeVore | Apr. 18, 1905 |
| 963,407 | Uhlir | July 5, 1910 |
| 1,096,250 | Lamb | May 12, 1914 |
| 2,057,421 | Dickson | Oct. 13, 1936 |
| 2,449,941 | Jauhiainen | Sept. 21, 1948 |